United States Patent
Sakata et al.

(10) Patent No.: US 12,326,719 B2
(45) Date of Patent: Jun. 10, 2025

(54) CONTROL SYSTEM

(71) Applicant: Hitachi, Ltd., Tokyo (JP)

(72) Inventors: Teruaki Sakata, Tokyo (JP); Noritaka Matsumoto, Tokyo (JP); Yusaku Otsuka, Tokyo (JP); Hidenori Omiya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 584 days.

(21) Appl. No.: 17/630,184

(22) PCT Filed: Apr. 14, 2020

(86) PCT No.: PCT/JP2020/016456
§ 371 (c)(1),
(2) Date: Jan. 26, 2022

(87) PCT Pub. No.: WO2021/024555
PCT Pub. Date: Feb. 11, 2021

(65) Prior Publication Data
US 2022/0276643 A1 Sep. 1, 2022

(30) Foreign Application Priority Data
Aug. 8, 2019 (JP) ................. 2019-146132

(51) Int. Cl.
*G05B 19/418* (2006.01)
(52) U.S. Cl.
CPC ... *G05B 19/41845* (2013.01); *G05B 19/4183* (2013.01); *G05B 19/41885* (2013.01)
(58) Field of Classification Search
CPC ............... G05B 19/4183; G05B 19/41845
See application file for complete search history.

(56) References Cited

U.S. PATENT DOCUMENTS

| | | | |
|---|---|---|---|
| 6,167,425 A | 12/2000 | Beckhoff | |
| 2016/0283276 A1 | 9/2016 | Enomoto et al. | |
| (Continued) | | | |

FOREIGN PATENT DOCUMENTS

| | | | |
|---|---|---|---|
| JP | 2008-108087 A | 5/2008 | |
| JP | 2011-232937 A | 11/2011 | |
| (Continued) | | | |

OTHER PUBLICATIONS

International Search Report of PCT/JP2020/016456 dated Jul. 14, 2020.

(Continued)

*Primary Examiner* — Scott T Baderman
*Assistant Examiner* — Seung Woon Jung
(74) *Attorney, Agent, or Firm* — MATTINGLY & MALUR, PC

(57) ABSTRACT

The present invention provides a control system that achieves both high reliability and versatility. A control system 100 of the present invention includes a control device 1 including an operating system 20, non-real-time software 21 executed on the operating system 20, and real-time software 22 executed on the operating system 20, an execution time analysis unit 50 that inputs and analyzes execution time information of the non-real-time software 21 and execution time information of the real-time software 22, and a real-time interface generation unit 52 that determines whether or not to generate binary data for updating processing of the control device from an analysis result of the execution time analysis unit.

4 Claims, 17 Drawing Sheets

(56) References Cited

U.S. PATENT DOCUMENTS

2019/0324449 A1* 10/2019 Wang ................ G01C 21/1656
2020/0019436 A1*  1/2020 Toku ..................... G06F 9/4887
2020/0409821 A1* 12/2020 Terada ................ G06F 9/45558

FOREIGN PATENT DOCUMENTS

| JP | 2016-167700 A | 9/2016 |
| JP | 2016-184373 A | 10/2016 |
| WO | 2018/186358 A1 | 10/2018 |

OTHER PUBLICATIONS

Japanese Office Action received in corresponding Japanese Application No. 2019-146132 dated May 9, 2023.

* cited by examiner

FIG. 5
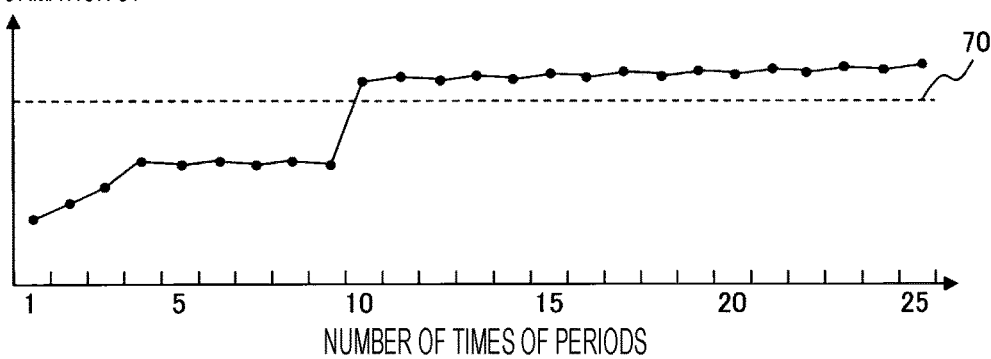
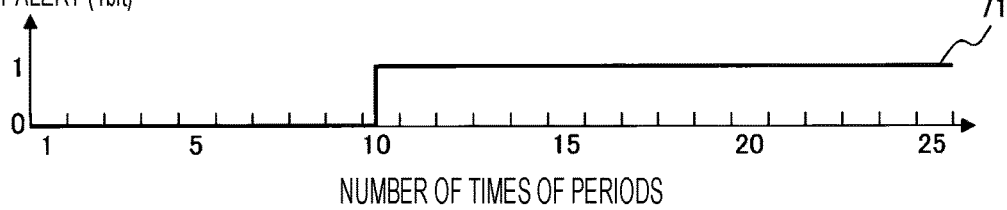
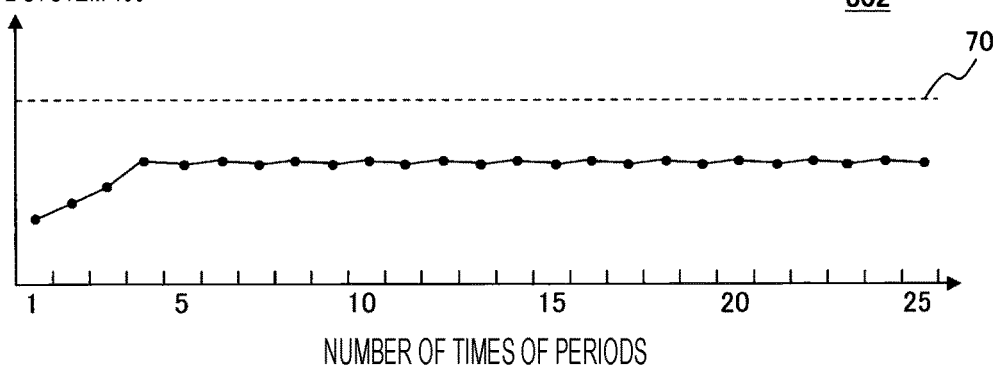

FIG. 11

```
1:  float funcA(float a, float b) {
2:      bool realtime = false;
3:      float c = calc_exec(a, b, realtime);
4:      return c;
5:  }
```
80

```
1:  float funcB(float a, float b) {
2:      bool realtime = true;
3:      float c = calc_exec(a, b, realtime);
4:      return c;
5:  }
```
81

```
1:  external int interrupt;
2:
3:  float calc_exec (float a, float b, bool realtime) {
4:      int *p1 = 0xFFFFA000;
5:      int *p2 = 0xFFFFB000;
6:      int *p3 = 0xFFFFC000;
7:      int *p4 = 0xFFFFD000;
8:
9:      if (realtime == true) {
10:         p1 = &a;
11:         p2 = &b;
12:         *p3 = 1; //trigger
13:         while (1) {
14:             if (interrupt == 1)
15:                 break;
16:         }
17:         float c = *p4;
18:     }
19:     else {
20:         float c = calc_exec_os(a, b);
21:     }
22:
23:     return c;
24: }
```
82

FIG. 13
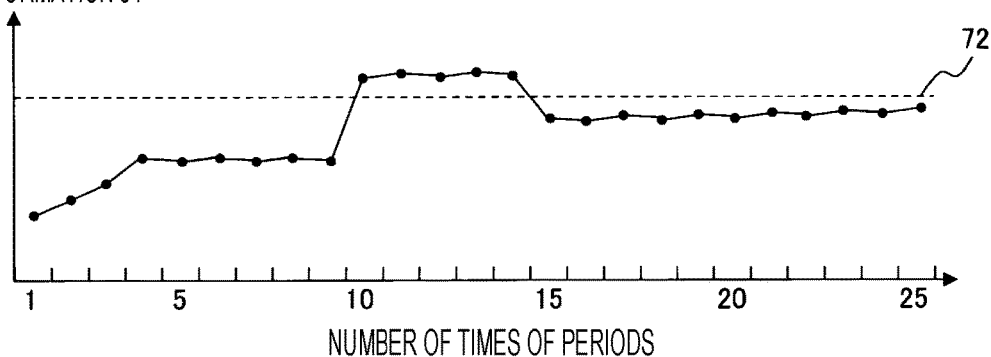
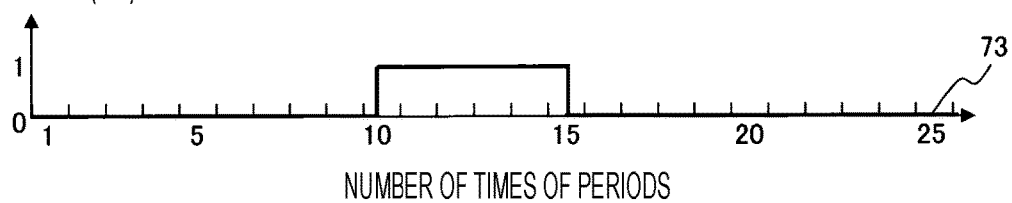
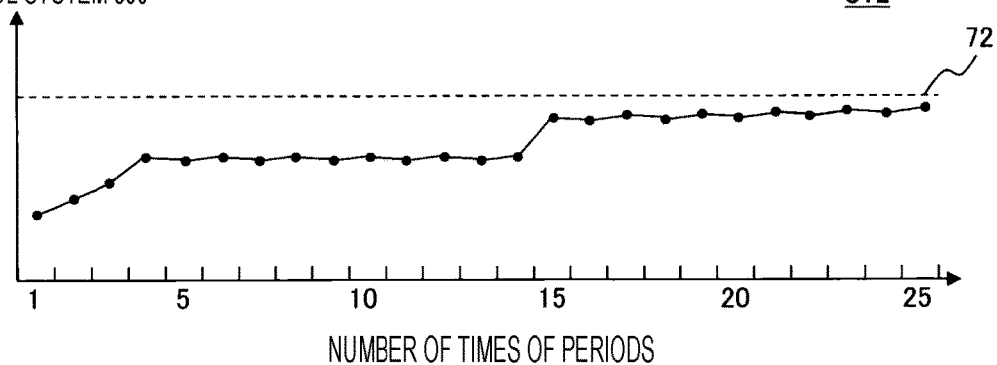

CONTROL SYSTEM

TECHNICAL FIELD

The present invention relates to a control system.

BACKGROUND ART

In various industrial fields, devices are disposed in the field and a control device that controls the devices is connected to construct a control system. In such a control system, the control device outputs control data (signal) to an operation device of the field to perform real time control while acquiring, from the field, and measuring a state quantity such as a flow rate, temperature, and pressure. Thus, a desired operation such as adjustment of the flow rate or an emergency stop when the state quantity becomes abnormal is executed, and safety and reliability as well as convenience are secured.

In recent years, in such industrial fields, in order to optimize control, an effort to Internet of Things (IoT) has been made, in which the type and amount of information to be sensed in the field are increased and collected, and data are analyzed in a virtual world and then fed back to the real world.

When an effort for IoT is advanced to the control system in this manner, the operation data that has not been handled before can be visualized, analyzed, and utilized, and a new value can be created in maintenance service and the like.

On the other hand, in order to advance the effort for IoT to the control system, it is necessary to implement, into the control system, an algorithm or artificial intelligence (AI) for processing a large amount of operation data acquired from the field devices. For this reason, in a control device that requires real-time processing for ensuring safety, it is required to execute complicated and versatile processing, but it is difficult to achieve a control device that satisfies both real-time property and versatility and a control system using the control device.

A background art of this technical field includes JP 2016-184373 A (Patent Literature 1). This Patent Literature 1 provides a process control system capable of responding to changes in the extended life period of a plant while ensuring real-time property and high reliability that are necessary for a process control system. Specifically, Patent Literature 1 describes that in a process control system in which a PC is connected to a redundant network, the PC includes a virtualization unit and a real-time communication unit that operates in a different process independent of the virtualization unit (see Abstract).

CITATION LIST

Patent Literature

PTL 1: JP 2016-184373 A

SUMMARY OF INVENTION

Technical Problem

Patent Literature 1 describes a technique in a process control system in which a PC is connected to a redundant network, the PC includes a virtualization unit and a real-time communication unit that operates in a different process independent of the virtualization unit.

However, the real-time communication unit that operates in a different process independent of the virtualization unit in PTL 1 is implemented as a real-time process limited to only functions essential for maintaining and checking a network communication path. Then, this real-time process operates together with another non-real-time process on an operating system (OS). Therefore, in a case where the type and number of non-real-time processes increase on the OS, the processing time allocated to the real-time process decreases, and it becomes difficult to secure the real-time property, but that problem is not described.

Solution to Problem

In order to solve the above problem, in the present invention, an execution time for processing of non-real-time software and real-time software is analyzed, and a configuration requirement (update configuration) of a control device to be updated is determined in order to execute the real-time software based on a result of the analysis.

A more specific control system of the present invention includes a control device that includes an operating system, non-real-time software executed on the operating system, and real-time software executed on the operating system, an execution time analysis unit that analyzes execution time information of the non-real-time software and execution time information of the real-time software that are input, and a real-time interface generation unit that determines an update configuration, which is a configuration element of the control device to be updated for executing processing of the real-time software, from an analysis result of the execution time analysis unit.

One aspect of the present invention also includes that the real-time interface generation unit determines whether to generate data for updating the determined update configuration. This data includes either binary data or bit stream data.

The determination of the update configuration to be updated in the real-time interface generation unit includes determination of any of software, an operating system, a real-time operating system (RTOS), and hardware such as a field programmable gate array (FPGA). The present invention also includes determining them by priority order of the software, the operating system, the RTOS, and hardware such as the FPGA, or collectively determining them.

The analysis of the execution time in the execution time analysis unit includes determining whether the execution time falls within a period that is a requirement for real-time control.

Advantageous Effects of Invention

According to the present invention, in the processing of real-time software, by providing a mechanism that determines a configuration element of a control system to be updated, it is possible to provide a control system that achieves both high reliability and versatility.

Note that problems, configurations, and effects other than those described above will be made clear by the description of the following embodiments.

BRIEF DESCRIPTION OF DRAWINGS

FIG. 5 is a timing chart illustrating an example of a flow in which the control system according to the first embodiment is activated and enters an operating state.

FIG. 11 is a block diagram illustrating an example of a software description according to the third embodiment.

FIG. 13 is a timing chart illustrating an example of a flow in which the control system according to the third embodiment is activated and enters an operating state.

DESCRIPTION OF EMBODIMENTS

Embodiments of the present invention will be described below with reference to the drawings. Note that in the description and the drawings, elements having substantially the same function or configuration are denoted by the same reference signs, and there is a case in which descriptions thereof are omitted if the descriptions thereof are redundant.

First Embodiment

Figure 1:
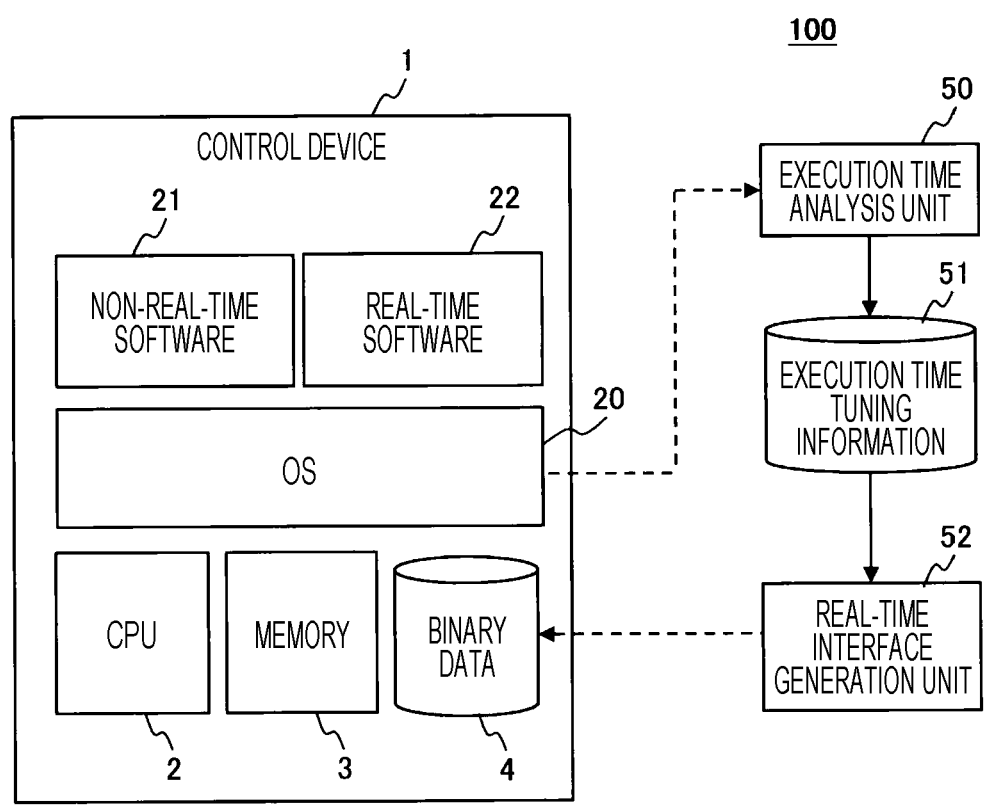
FIG. 1 is a block diagram illustrating an example of a control system according to a first embodiment.

First, a control system 100 according to the first embodiment will be described with reference to the drawings. FIG. 1 is a block diagram illustrating the control system 100 according to the first embodiment.

The control system 100 described in the first embodiment includes a control device 1, an execution time analysis unit 50, and a real-time interface generation unit 52, and inputs execution time tuning information 51 output from the execution time analysis unit 50 to the real-time interface generation unit 52.

The control device 1 includes a central processing unit (CPU) 2 and a memory 3, which is a storage unit. The control device 1 further includes an OS 20 that operates on the CPU 2 and the memory 3, non-real-time software 21 that operates on the OS 20, and real-time software 22. The CPU 2 executes various calculations and controls for operating the OS 20 and each piece of software. The memory 3 stores temporary data and the like for operating the OS 20 and each piece of software.

Binary data 4 generated from the real-time interface generation unit 52 includes information for updating the OS 20, the non-real-time software 21, and the real-time software 22 in the control device 1.

In the control device 1, the non-real-time software 21 and the real-time software 22 perform processing of the control system 100. Then, execution time information of each piece of software is input to the execution time analysis unit 50 via the OS 20, and the execution time tuning information 51 is output as a result of analysis by the execution time analysis unit 50. The real-time interface generation unit 52 generates the binary data 4 based on the execution time tuning information 51, and the binary data 4 is used by the control device 1 as update information of the control device 1. Here, the execution time analysis unit 50 and the real-time interface generation unit 52 are achieved by a calculation device such as a CPU according to a program. The processing will be described later. These may be provided in the same housing as the control device 1, or may be provided as a separate housing.

Note that although FIG. 1 illustrates an example in which there are one type of non-real-time software and one type of real-time software, there may be a plurality of types.

Figure 2:
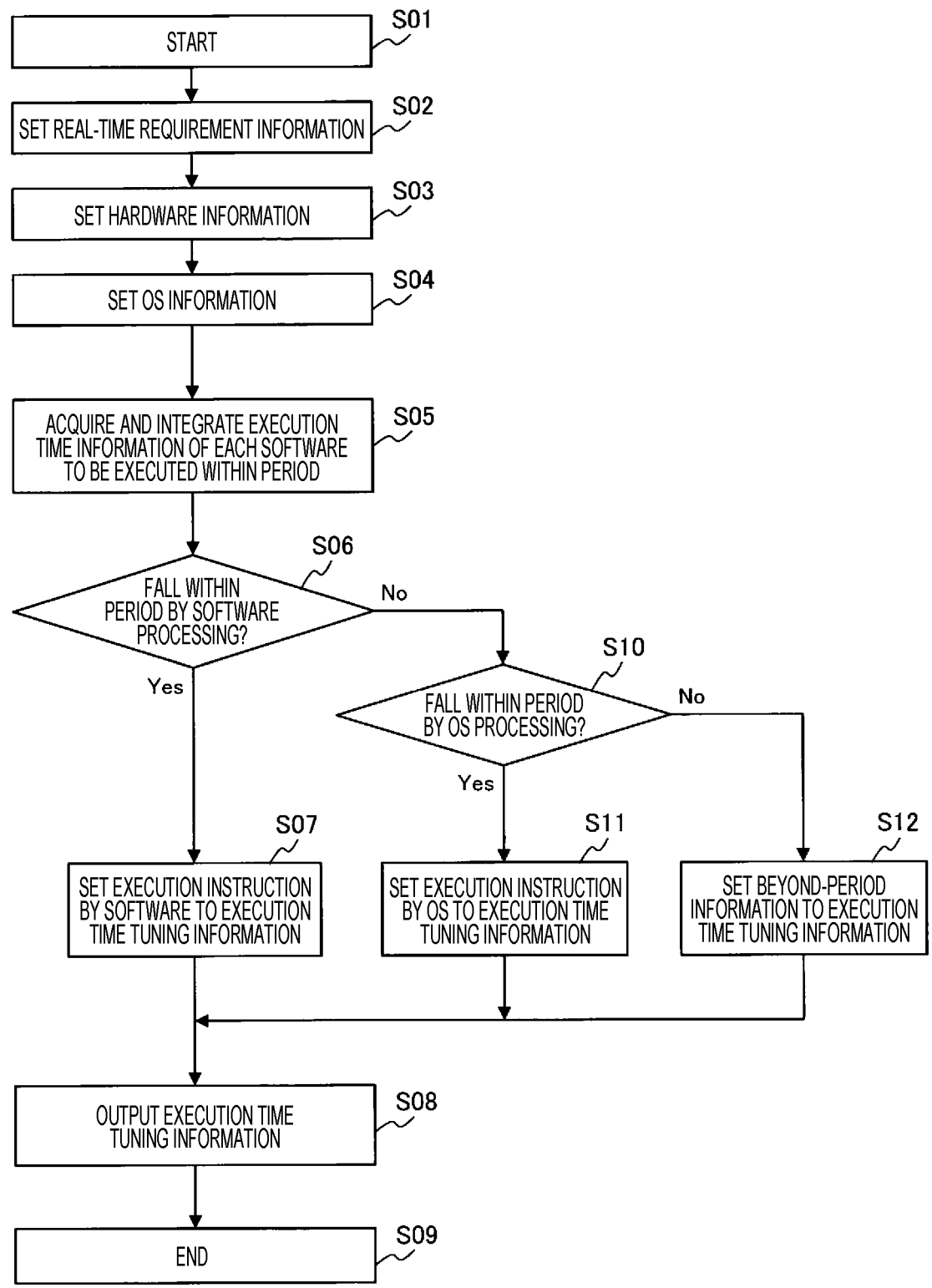
FIG. 2 is a flowchart illustrating an example of an execution time analysis unit according to the first embodiment.

Next, the execution time analysis unit 50 according to the first embodiment will be described. FIG. 2 is a flowchart illustrating the execution time analysis unit 50 according to the first embodiment.

In step S01, the operation of the execution time analysis unit 50 starts.

Step S02 is a step for setting information such as a numerical value of a period that is a requirement for real-time control to the execution time analysis unit 50.

Step S03 is a step for setting hardware information of the CPU 2, the memory 3, and the like to the execution time analysis unit 50.

Step S04 is a step for setting information of the OS 20 to the execution time analysis unit 50.

Step S05 is a step for acquiring and integrating, from the OS 20, execution time information of each piece of software (for example, all software) that the execution time analysis unit 50 executes within a period that is a requirement for real-time control. The software here includes at least one of the non-real-time software 21 and the real-time software 22 illustrated in FIG. 1. For example, a system call, an application programming interface (API), or the like is used. By using execution time information of this software, it is determined in steps S06 and S10 as to which of software processing or OS processing the real-time software processing is performed by. In other words, in order to execute the real-time software processing within a period, it is determined as to which of software or an OS the update configuration to be updated is. The content will be described below. In steps S06 and S10, the determination is made in the order of S06 and S10. This is because updating the software for the purpose of executing within the period takes less time and effort and is more efficient than the OS. Note that this determination order is the same in the second and third embodiments.

Step S06 is a step for determining whether or not the software execution time integrated in step S05 falls within the period that is a requirement for real-time control. If the software execution time falls within the period by the software processing, the process proceeds to step S07. However, if it does not fall within the period, the process proceeds to step S08.

Step S07 is a step for setting an execution instruction by the software to the execution time tuning information 51.

Step S10 is a step for determining whether or not the software execution time integrated in step S06 falls within the period by the OS processing in a case where it is determined that the software execution time does not fall within the period that is a requirement for real-time control. If the software execution time falls within the period by the OS processing, the process proceeds to step S11. However, if it does not fall within the period, the process proceeds to step S12.

Step S11 is a step for setting an execution instruction by the OS to the execution time tuning information 51.

Step S12 is a step for setting, to the execution time tuning information 51, beyond-period information indicating not falling within the period that is a requirement for real-time control.

Step S08 is a step for outputting the execution time tuning information 51. When the execution time tuning information is output, the operation of the execution time analysis unit 50 ends in step S09.

Through the series of these steps, the execution time analysis unit 50 described in the present embodiment operates.

Next, the real-time interface generation unit 52 according to the first embodiment will be described. FIG. is a flowchart illustrating the real-time interface generation unit 52 according to the first embodiment.

In step S21, the operation of the real-time interface generation unit 52 starts.

Step S22 is a step for setting hardware information of the CPU 2, the memory 3, and the like to the real-time interface generation unit 52.

Step S23 is a step for setting information of the OS 20 to the real-time interface generation unit 52.

Step S24 is a step for inputting the execution time tuning information 51 output from the execution time analysis unit 50 described in FIG. 2.

Step S25 is a step for determining whether or not the content of the execution time tuning information 51 falls within a period that is a requirement for real-time control, that is, whether or not it falls beyond the period. If it does not fall beyond the period, the process proceeds to step S26. However, if it falls beyond the period, the process proceeds to step S28.

Step S26 is a step for compiling software.

Step S27 is a step for generating the binary data 4 that can be executed by the CPU 2 based on the compiling result of the software. When the binary data 4 is generated, the operation of the real-time interface generation unit 52 ends in step S28.

Through the series of these steps, the real-time interface generation unit 52 described in the present embodiment operates.

Next, a configuration in a case where software is added in the control device 1 according to the first embodiment will be described.

Figure 4:
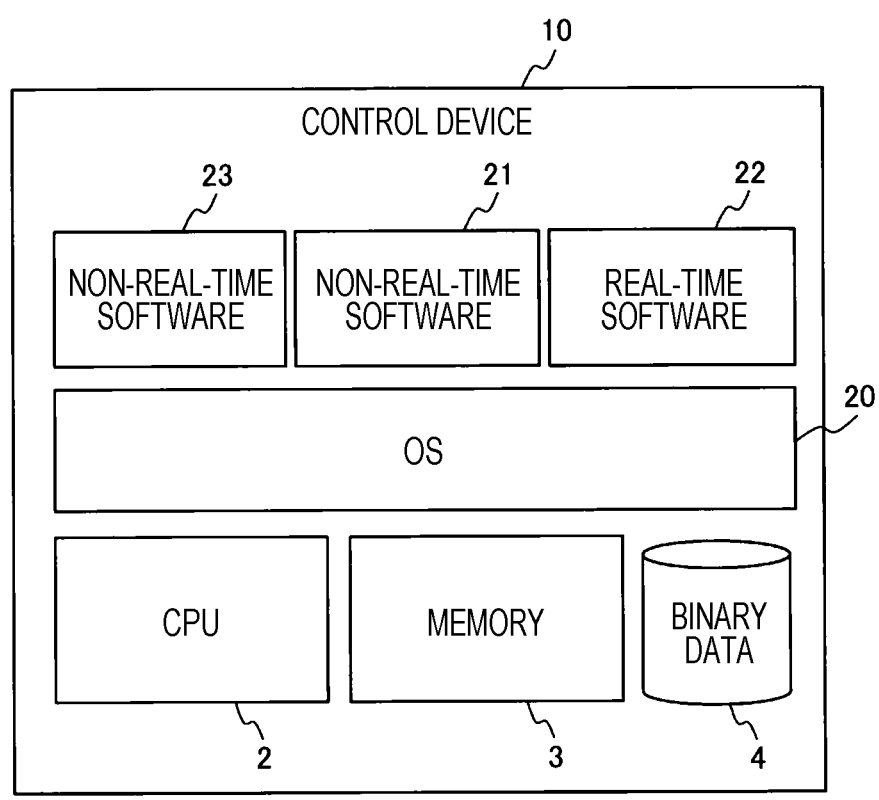
FIG. 4 is a block diagram illustrating an example of a control device according to the first embodiment.

FIG. 4 is a block diagram illustrating a control device 10 according to the first embodiment. The control device 10 illustrated in FIG. 4 is different from the control device illustrated in FIG. 1 in that the control device 10 includes non-real-time software 23 that operates on the OS 20.

In a case where the processing of the non-real-time software 23 is added to the control device 10, it is determined in step S06 that the execution time analysis unit 50 illustrated in FIG. 2 does not fall beyond the period by the software processing. Then, the real-time interface generation unit 52 illustrated in FIG. 3 generates the binary data 4 in step S27, the binary data 4 is reflected in the control device 1, and the non-real-time software 23 is added in the OS 20.

Note that although FIG. 4 illustrates an example in which one piece of non-real-time software is added, one piece of real-time software may be added, or a plurality of pieces of each piece of software may be added.

Next, the flow of operation of the control system 100 will be described using a timing chart. FIG. 5 is a timing chart illustrating a process in which the control system 100 is activated and enters an operating state.

In a timing chart 800 of FIG. 5, the horizontal axis represents the number of times of periods, and the vertical axis represents the execution time within one period of the control system 100 integrated by the execution time tuning information 51. A threshold value 70 indicates a period that is a requirement for real-time control of the control system 100, and indicates that real-time property is not guaranteed when the execution time in the period exceeds the threshold value 70.

In a timing chart 801 of FIG. 5, the horizontal axis represents the number of times of periods, and the vertical axis represents an alert output 71 (here, 1 bit).

In a timing chart 802 of FIG. 5, the horizontal axis represents the number of times of periods, and the vertical axis represents the execution time within one period of the control system 100.

The numbers of times of periods on the horizontal axis of the timing charts 800, 801, and 802 are common.

At the first of the number of times of periods, the control system 100 is activated, execution of a plurality of pieces of non-real-time software and real-time software starts within one period, and the execution time of the control system 100 within one period is calculated. At the first of the number of times of periods, the total of the execution time within one period does not exceed the threshold value 70, and hence it is indicated that the control system 100 normally operates.

The timing chart 800 indicates that the execution time within one period increases because the software to start the execution after the control system 100 is activated increases up to the fourth of the number of times of periods, and the fluctuation of the total of the execution time within the period decreases at the fifth and subsequent number of times of periods.

The timing chart 801 indicates that the alert output 71 during this is 0.

The timing chart 802 indicates that the execution time during this is similar to that of the timing chart 800.

Here, in the tenth of the number of times of periods of the timing chart 800, the execution time within one period exceeds the threshold value 70 due to the addition of new non-real-time software.

The timing chart 801 indicates that 1 is output as the alert output 71 because the execution time within one period exceeds the threshold value 70 at the tenth and subsequent number of times of periods.

The timing chart 802 indicates that the non-real-time software is not executed in the control system 100 in response to the alert output 71 of the tenth and subsequent number of times of periods being 1, and the absolute value of the total of the execution time within the period hardly changes even at the tenth and subsequent number of times of periods.

According to the present embodiment, in the control system for which real-time property is required, it becomes possible to add highly versatile processing by software while maintaining the real-time property, and it is possible to achieve the control system that achieves both high reliability and versatility.

Second Embodiment

Figure 6:
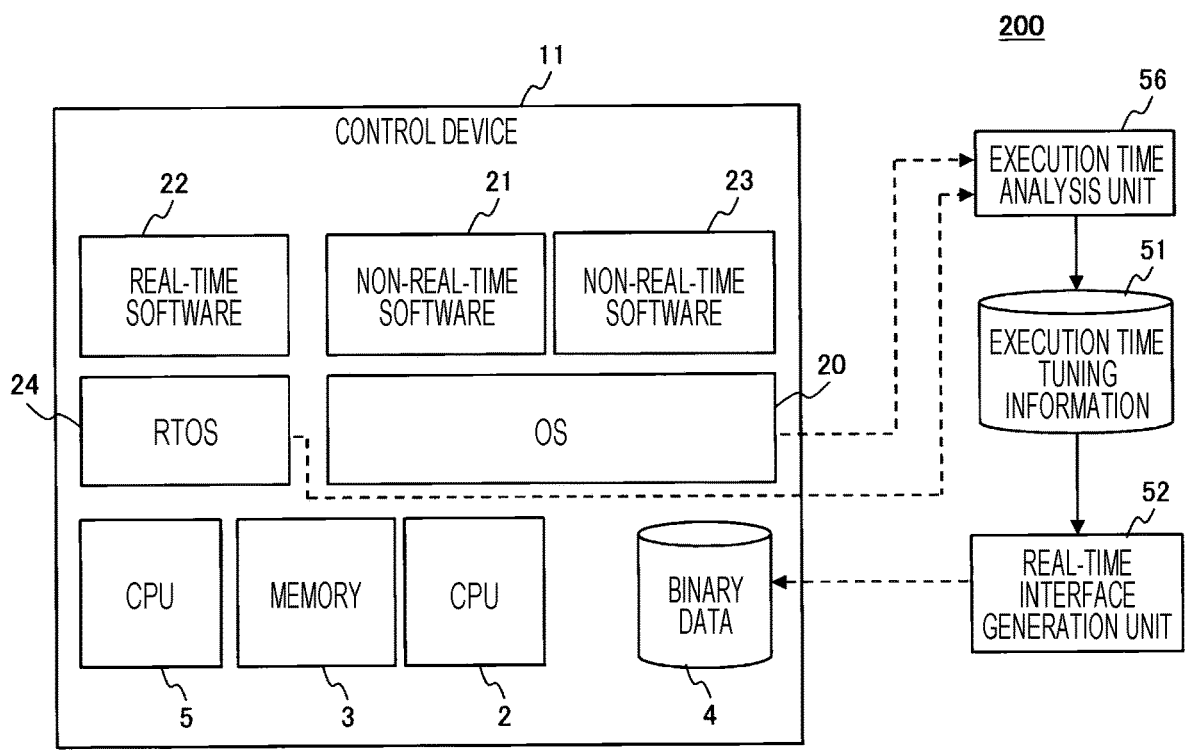
FIG. 6 is a block diagram illustrating an example of a control system according to a second embodiment.

Next, a control system 200 according to the second embodiment will be described with reference to the drawings. FIG. 6 is a block diagram illustrating the control system 200 according to the second embodiment.

The control system 200 described in the present embodiment executes real-time software by a real-time operating system (RTOS).

The control system 200 described in the present embodiment is different from the control system 100 of the first embodiment (FIG. 1) in that a control device 11 includes the non-real-time software 23, a CPU 5, and an RTOS 24, and the real-time software 22 is executed by the RTOS 24.

In the control device 11, the non-real-time software 21 and 23 and the real-time software 22 perform processing of the control system 200. Execution time information of each piece of software is input to an execution time analysis unit 56 via the OS 20 and the RTOS 24, and the execution time tuning information 51 is output as a result of analysis by the execution time analysis unit 56. The real-time interface generation unit 52 generates the binary data 4 based on the execution time tuning information 51, and the binary data 4 is used by the control device 11 as update information of the control device 11.

Note that FIG. 6 illustrates an example in which there are two types of non-real-time software and one type of real-time software, but there may be further a plurality of types of software.

Furthermore, FIG. 6 illustrates an example in which the OS 20 and the RTOS 24 share the memory 3, but the OS 20 and the RTOS 24 may be configured to use independent memories from each other.

Next, the execution time analysis unit 56 according to the second embodiment will be described.

Figure 7:
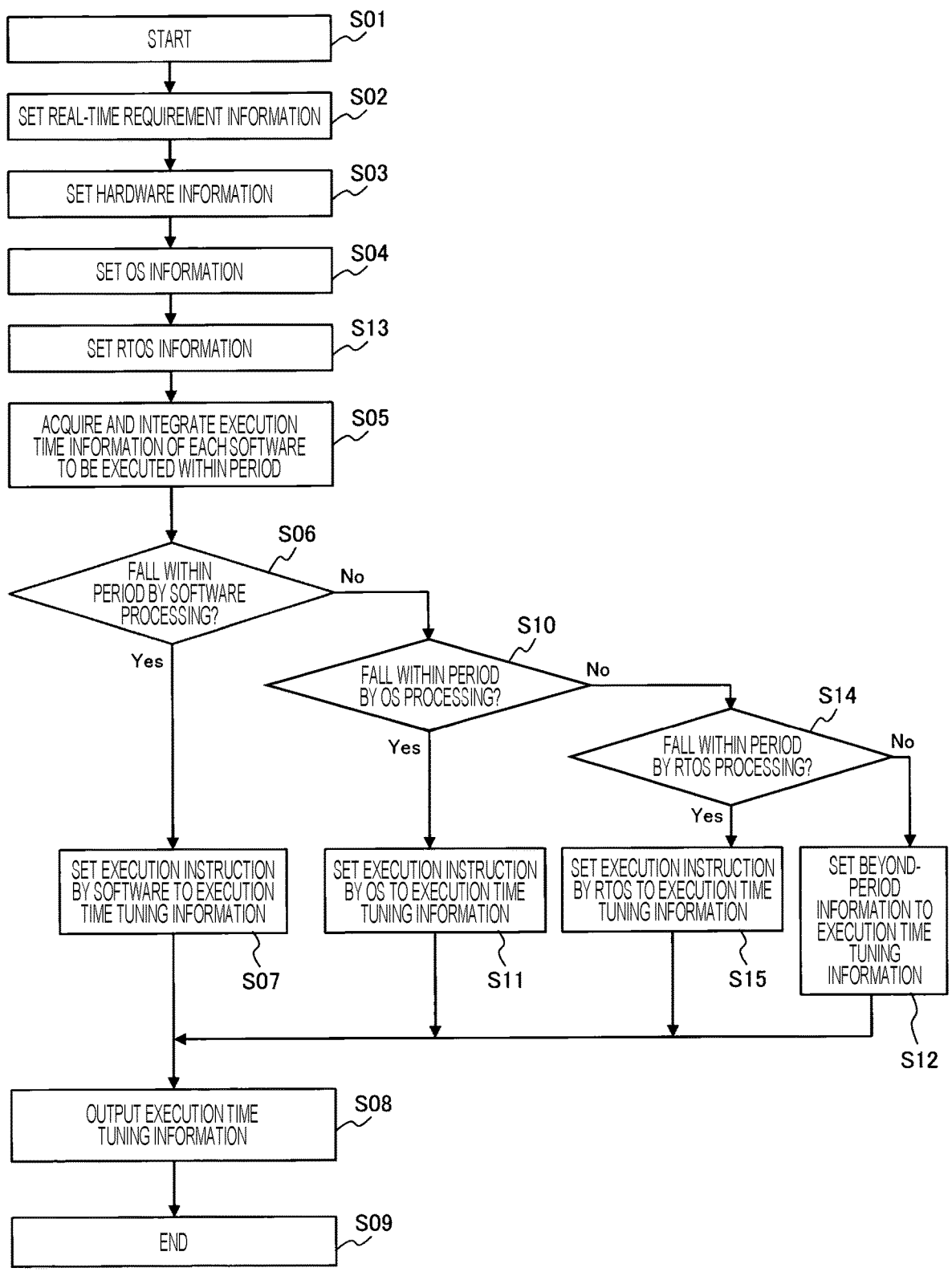
FIG. 7 is a flowchart illustrating an example of an execution time analysis unit according to the second embodiment.

FIG. 7 is a flowchart illustrating the execution time analysis unit 56 according to the second embodiment. The flowchart of the execution time analysis unit 56 illustrated in FIG. 7 is different from the flowchart of the execution time analysis unit 50 described in the first embodiment (FIG. 2) in that steps S13, S14, and S15 are added. Thus, the execution time analysis unit 56 has a function similar to that of the execution time analysis unit 50 of the first embodiment, and can execute the processing in and after step S14 by changing the program. Therefore, similarly to the execution time analysis unit 50, the execution time analysis unit 56 can be achieved by a calculation device that executes processing according to a program.

In step S01, the operation of the execution time analysis unit 56 starts, and the processing is executed similarly to that in the flowchart described in the first embodiment (FIG. 2). In FIG. 2, the update configuration to be updated is determined in steps S06 and S10. Meanwhile, in the present embodiment, the processing in and after step S14 are further provided, and the RTOS is added as the update configuration to be updated. The order of determination in steps S06, S10, and S14 is determined for the same reason as that of the first embodiment.

Step S13 is a step for setting information of the RTOS 24 to the execution time analysis unit 56.

Step S14 is a step for determining whether or not the software execution time integrated in step S06 falls within the period by the RTOS processing in a case where it is determined that the software execution time does not fall within the period that is a requirement for real-time control. If the software execution time falls within the period by the RTOS processing, the process proceeds to step S15. However, if it does not fall within the period, the process proceeds to step S12.

Step S15 is a step for setting an execution instruction by the RTOS to the execution time tuning information 51.

Processing is executed in the other steps similarly to the those in the flowchart illustrated in the first embodiment (FIG. 2), and the operation of the execution time analysis unit 56 ends in step S09.

Through the series of these steps, the execution time analysis unit 56 described in the present embodiment operates.

According to the present embodiment, in the control system in which the OS and the RTOS with high real-time property are used for the control device, the RTOS or the OS is selected to perform the processing with high real-time property. As a result, it becomes possible to add highly versatile processing by software while maintaining the real-time property, and it is possible to achieve the control system that achieves both high reliability and versatility.

Third Embodiment

Figure 8:
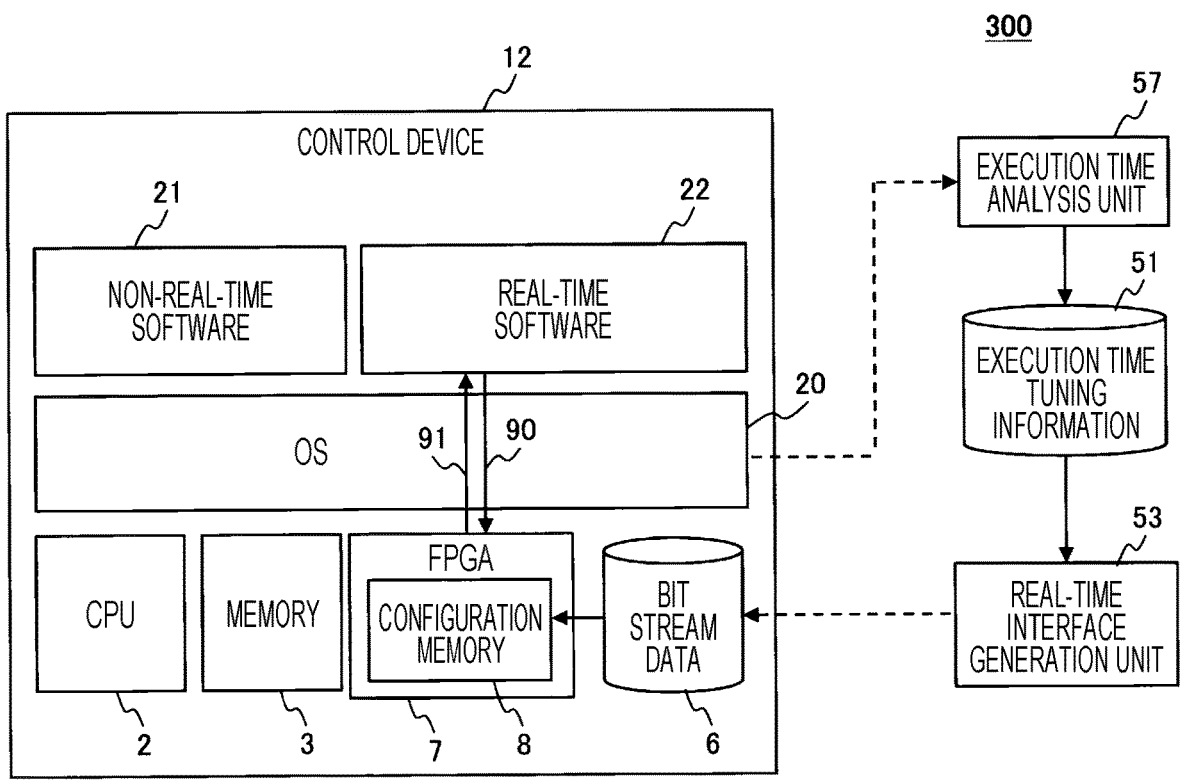
FIG. 8 is a block diagram illustrating an example of a control system according to a third embodiment.

Next, a control system 300 according to the third embodiment will be described with reference to the drawings. FIG. 8 is a block diagram illustrating the control system 300 according to the third embodiment.

The control system 300 described in the present embodiment executes real-time software by a field programmable gate array (FPGA).

The control system 300 described in the present embodiment is different from the control system 100 described in the first embodiment (FIG. 1) in that a control device 12 includes an FPGA 7 incorporating a configuration memory 8, and the real-time software 22 is executed by the FPGA 7.

In the control device 12, the non-real-time software 21 and the real-time software 22 perform processing of the control system 300. Execution time information of each piece of software is input to the execution time analysis unit 50 via the OS 20, and the execution time tuning information 51 is output as a result of analysis by the execution time analysis unit 50. A real-time interface generation unit 53 generates bit stream data 6 based on the execution time tuning information 51, and the bit stream data 6 is used by the control device 12 as update information of the control device 12. In this example, the bit stream data 6 updates the configuration memory 8 constituting the circuit of the FPGA 7.

Note that although FIG. 8 illustrates an example in which there are one type of non-real-time software and one type of real-time software, there may be a plurality of types.

Next, an execution time analysis unit 57 according to the third embodiment will be described. Note that the execution time analysis unit 57 has function similar to that of the execution time analysis unit 50 of the first embodiment and the execution time analysis unit 56 of the second embodiment, and can execute the processing in and after step S17 by changing the program. Therefore, similarly to the execution time analysis unit 50 and the execution time analysis unit 56, the execution time analysis unit 57 can be achieved by a calculation device that executes processing according to a program.

Figure 9:
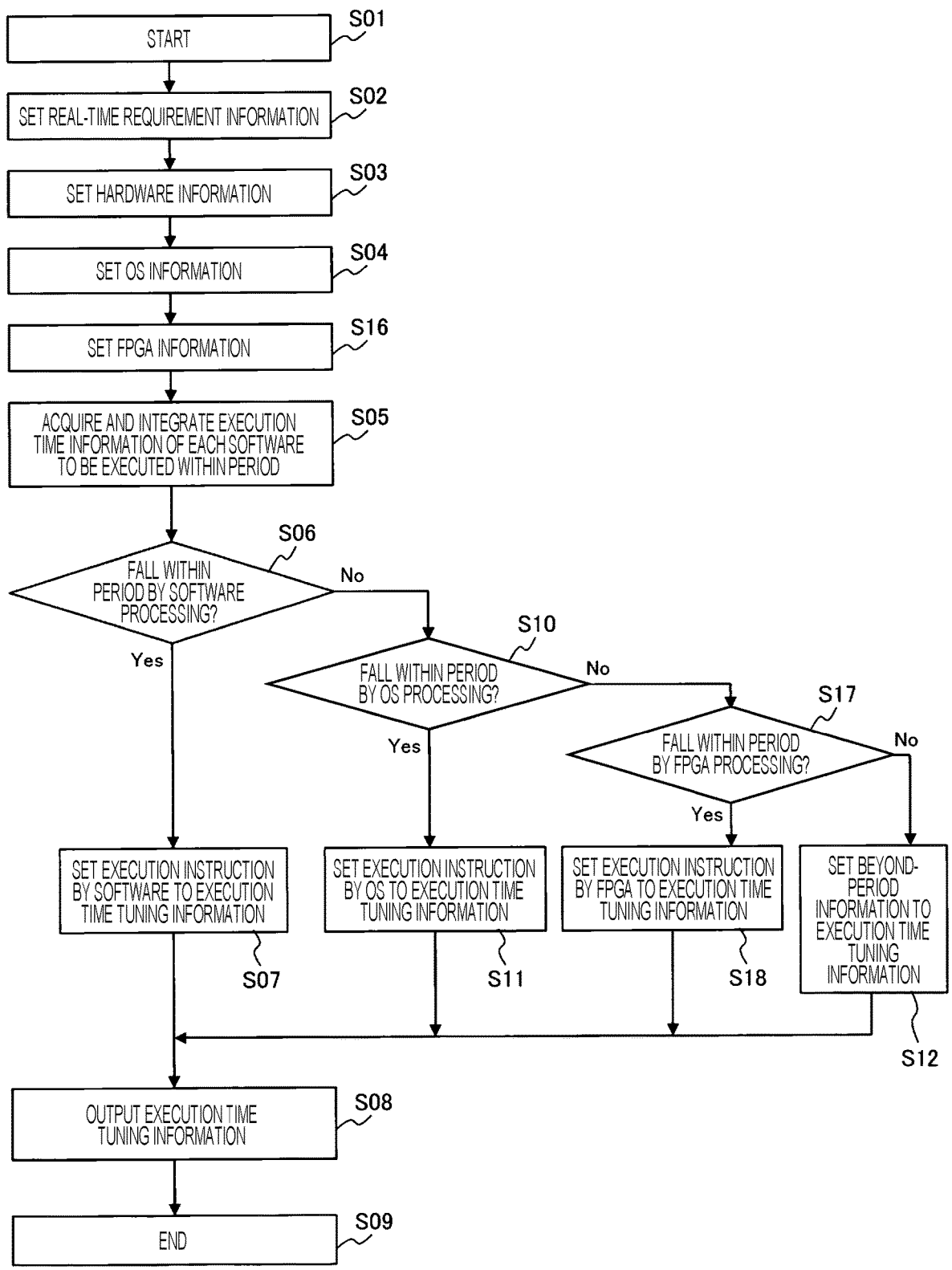
FIG. 9 is a flowchart illustrating an example of an execution time analysis unit according to the third embodiment.

FIG. 9 is a flowchart illustrating the execution time analysis unit 57 according to the third embodiment. The execution time analysis unit 57 illustrated in FIG. 9 is different from the execution time analysis unit 56 described in the second embodiment (FIG. 7) in that step S13 is changed to step S16, step S14 is changed to step S17, and step S15 is changed to step S18. That is, the FPGA is used in place of the RTOS as the update configuration. Note that in the present embodiment, both the RTOS and the FPGA may be used. In this case, whether the RTOS processing falls within the period is determined before the FPGA and after the OS. Furthermore, determining at least two of software, the OS, the RTOS, and the FPGA is also included in the present invention.

In the first to third embodiments, the determination is made in a serial manner such as software→OS→RTOS, but the determination may be made in parallel for each configuration.

In step S01, the operation of the execution time analysis unit 57 starts, and the processing is executed similarly to that in the flowchart described in the second embodiment (FIG. 7).

Step S16 is a step for setting information of the FPGA 7 to the execution time analysis unit 57.

Step S17 is a step for determining whether or not the software execution time integrated in step S06 falls within the period by the FPGA processing in a case where it is determined that the software execution time does not fall within the period that is a requirement for real-time control. If the software execution time falls within the period by the FPGA processing, the process proceeds to step S18. However, if the software execution time does not fall within the period by the FPGA processing, the process proceeds to step S12.

Step S18 is a step for setting an execution instruction by the FPGA to the execution time tuning information 51.

Processing is executed in the other steps similarly to the those in the flowchart illustrated in the second embodiment (FIG. 7), and the operation of the execution time analysis unit 57 ends in step S09. Through the series of these steps, the execution time analysis unit 57 described in the present embodiment operates.

Next, the real-time interface generation unit 53 according to the third embodiment will be described. FIG. is a flowchart illustrating the real-time interface generation unit 53 according to the third embodiment.

Figure 10:
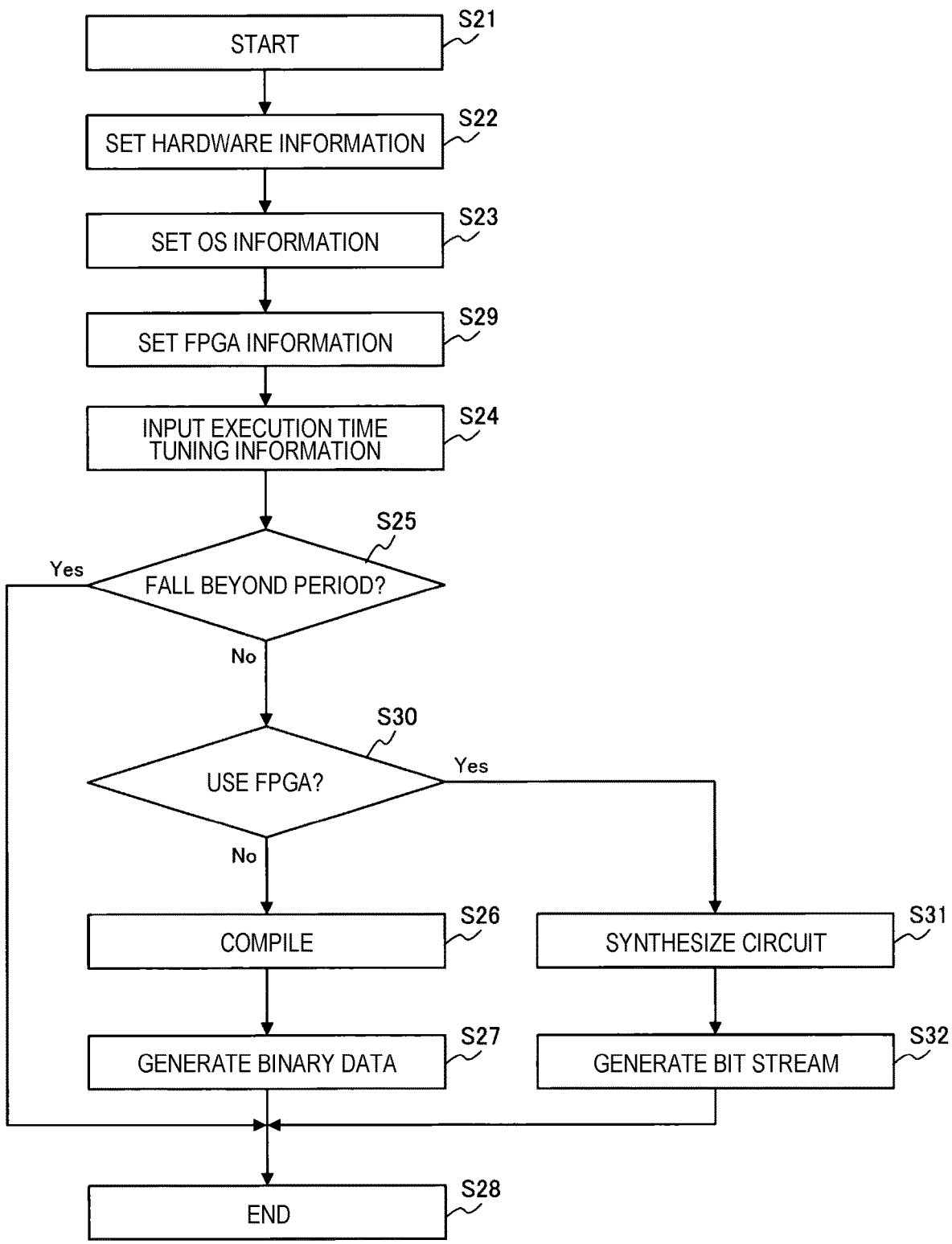
FIG. 10 is a flowchart illustrating an example of a real-time interface generation unit according to the third embodiment.

The flowchart of the real-time interface generation unit 53 illustrated in FIG. 10 is different from the flowchart of the real-time interface generation unit 52 described in the first embodiment (FIG. 3) in that steps S29, S30, S31, and S32 are added. Here, the real-time interface generation unit 53 has a similar function to that of the real-time interface generation unit 52 of the first and second embodiments. Therefore, it becomes possible to change the processing by changing the program.

Figure 3:
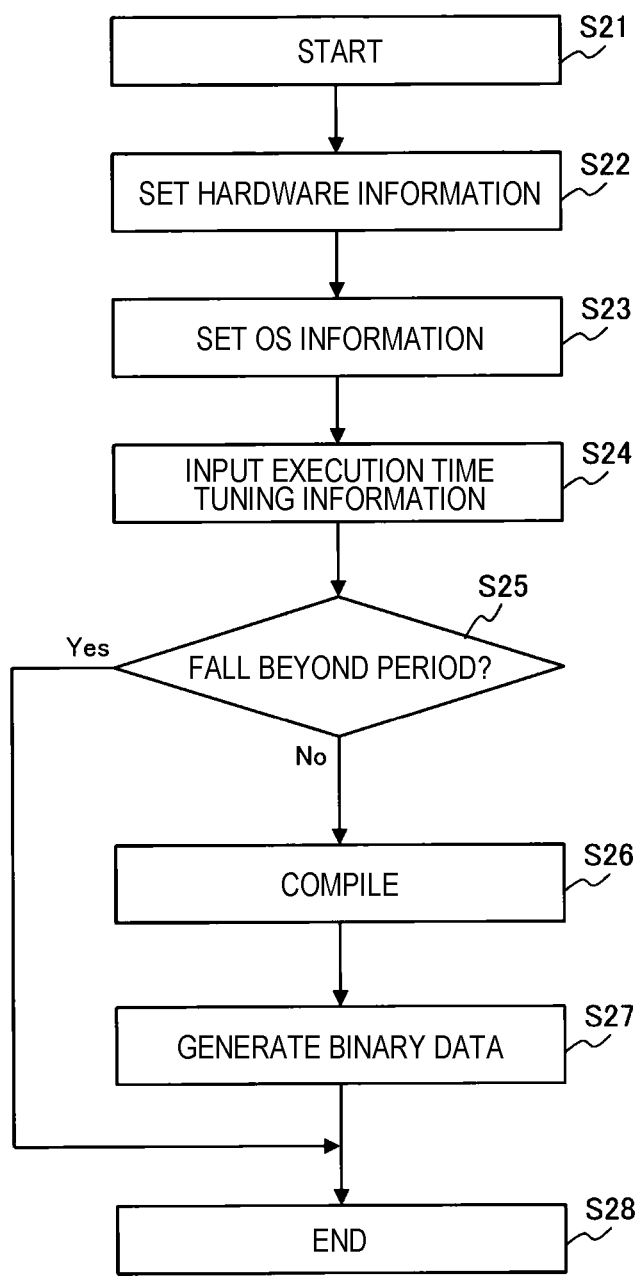
FIG. 3 is a flowchart illustrating an example of a real-time interface generation unit according to the first embodiment.

In step S21, the operation of the real-time interface generation unit 53 starts, and the processing is executed similarly to that in the flowchart described in the first embodiment (FIG. 3).

Step S29 is a step for setting information of the FPGA 7 to the real-time interface generation unit 52.

Step S25 is a step for determining whether or not the content stored in the execution time tuning information 51 falls beyond the period. If it does not fall beyond the period, the process proceeds to step S30. However, if it falls beyond the period, the process proceeds to step S28.

Step S30 is a step for determining whether or not to use the FPGA for processing of the real-time software. At the time point when the execution time tuning information is input in step S24, it has been determined whether or not to use the FPGA. If the FPGA is not used, the process proceeds to step S26. However, if the FPGA is used, the process proceeds to step S31.

Step S31 is a step for synthesizing a circuit in which the processing of the real-time software is implemented by the FPGA 7.

Step S32 is a step for generating, as bit stream data 6 operable in the FPGA 7, the circuit synthesized in step S31.

Processing is executed in the other steps similarly to the those in the flowchart illustrated in the first embodiment (FIG. 3), and the operation of the real-time interface generation unit 53 ends in step S28.

Through the series of these steps, the real-time interface generation unit 53 described in the present embodiment operates.

Next, an example of software to be executed by the control system 300 and an API provided by the OS 20 will be described.

FIG. 11 is a source code illustrating a software description according to the third embodiment.

A software description 80 of FIG. 11 is an example of an excerpt of a part of the content of the non-real-time software 21.

In the line 1 of the software description 80, float type (float) non-real-time software having float variables a and b as arguments is defined as a function funcA.

In the line 2 of the software description 80, false is set to a Boolean type (bool) variable realtime.

In the line 3 of the software description 80, a function calc_exec provided as an API using the variables a, b, and realtime as arguments is called, and the return value is substituted into a float variable c.

In the line 4 of the software description 80, the variable c is set as the return value of the function funcA, and the process ends in the line 5.

A software description 81 of FIG. 11 is an example of an excerpt of a part of the content of the real-time software 22.

In the line 1 of the software description 81, float non-real-time software having the float variables a and b as arguments is defined as a function funcB.

In the line 2 of the software description 81, true is set to the bool variable realtime.

In the line 3 of the software description 81, the function calc_exec provided as an API using the variables a, b, and realtime as arguments is called, and the return value is substituted into the float variable c.

In the line 4 of the software description 81, the variable c is set as the return value of the function funcB, and the process ends in the line 5.

A software description 82 of FIG. 11 is an example of an excerpt of a part of the content of the API provided by the OS 20.

In the line 1 of the software description 82, an integer type (int) external variable interrupt is defined.

In the line 3 of the software description 82, the float function calc_exec used as an API using the float variables a and b and the bool variable realtime as arguments is defined.

In the line 4 of the software description 82, an int pointer variable p1 is defined, and a 32-bit hexadecimal number 0xFFFFA000 is set as an address space for storing the value of the variable a.

In the line 5 of the software description 82, an int pointer variable p2 is defined, and a 32-bit hexadecimal number 0xFFFFB000 is set as an address space for storing the value of the variable b.

In the line 6 of the software description 82, an int pointer variable p3 is defined, and a 32-bit hexadecimal number 0xFFFFC000 is set as an address space used for the trigger of the start of the FPGA processing.

In the line 7 of the software description 82, an int pointer variable p4 is defined, and a 32-bit hexadecimal number 0xFFFFD000 is set as an address space for storing the value of the return value c.

If the variable realtime is true in the line 9 of the software description 82, this API is called from the real-time software and determines that processing by the FPGA is necessary. Therefore, the address of the variable a is set to the variable p1 in the line 10, the address of the variable b is set to the variable p2 in the line 11, and the address of the value of 1 is set to the variable p3 in the line 13, thereby instructing the start of the processing by the FPGA.

The process enters weight processing by the loop description of while (1) in the line 13 of the software description 82. When 1 is set to the variable interrupt in the line 14, the process transitions to the line 17, and the value stored in the address of the return value p4 is substituted into the float variable c.

On the other hand, the line 19 of the software description 82 is a portion that transitions when the variable realtime is false in the line 9, and this API is called by the non-real-time software and determines that the processing by the FPGA is unnecessary. Therefore, a function calc_exec_os( ) is called in the line 20, and the return value is substituted into the float variable c. This calc_exec_os( ) is a function that performs processing as software on the OS 20.

The variable c is set as the return value of the function calc_exec( ) in the line 23 of the software description 82, and the process ends in the line 24.

With such a software description, even in a case where the non-real-time software and the real-time software call similar functions and execute processing, the processing target can be appropriately distributed to the OS, the FPGA, or the like using a similar function call description.

Next, an example of a configuration in a case where real-time software is processed by the FPGA will be described.

Figure 12:
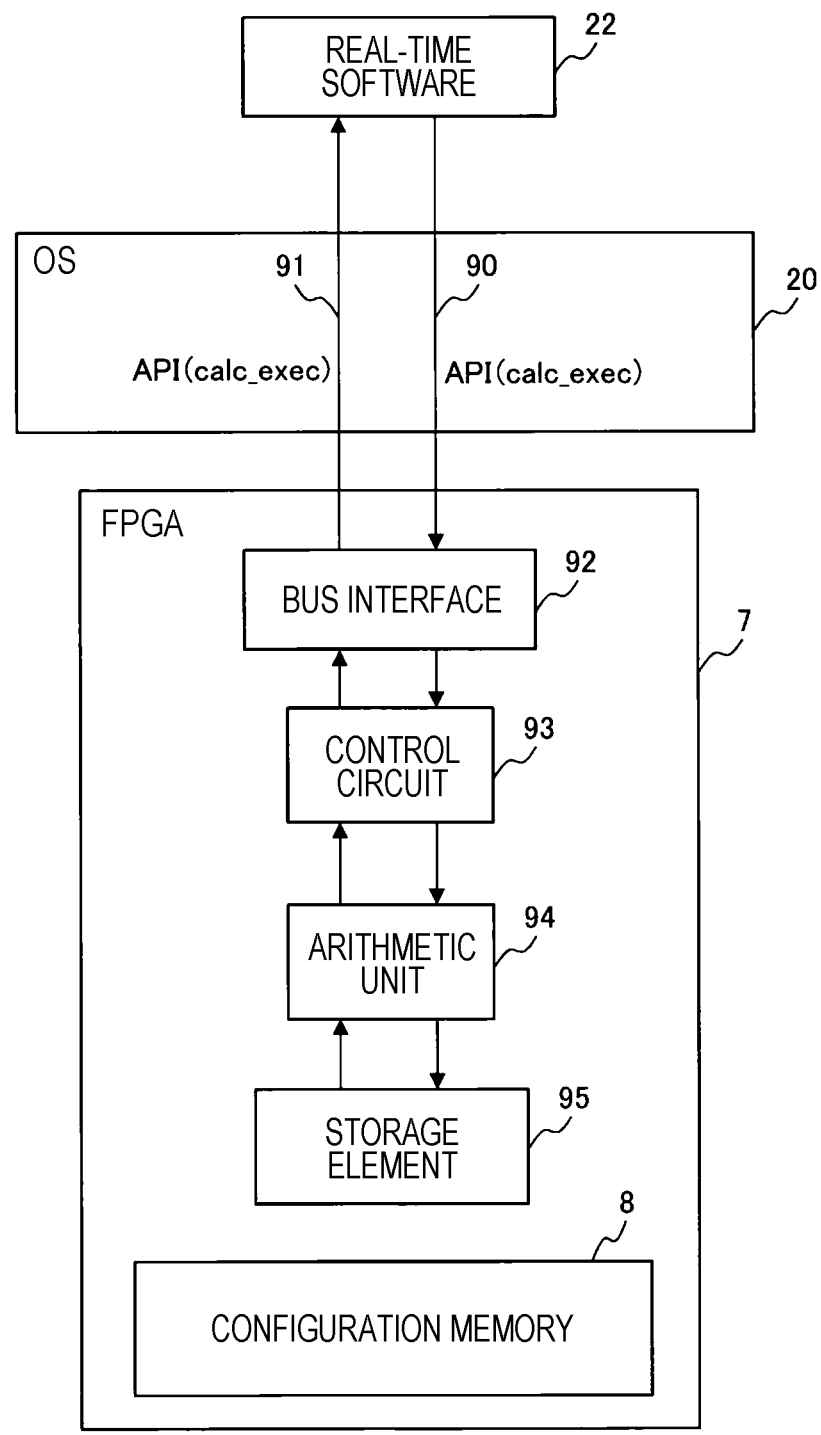
FIG. 12 is a block diagram illustrating an example of real-time software, an OS, and an FPGA in a control system according to the third embodiment.

FIG. 12 is a block diagram illustrating the configurations of the OS 20, the real-time software 22, and the FPGA 7 in the control device 12 according to the third embodiment.

The real-time software 22 is a target to be executed by the FPGA 8. Therefore, the OS 20 transmits a signal serving as an argument to a bus interface 92 of the FPGA 8 via an API (calc_exec) 90 illustrated in the software description 82 of FIG. 11.

As a result of execution of processing by a control circuit 93, an arithmetic unit 94, and a storage element 95 in the FPGA 7, a signal serving as a return value is input from the bus interface 92 to the real-time software 22 via an API (calc_exec) 91.

Next, the flow of operation of the control system 300 will be described using a timing chart.

FIG. 13 is a timing chart illustrating a process in which control system 300 is activated and enters an operating state.

In a timing chart 810 of FIG. 13, the horizontal axis represents the number of times of periods, and the vertical axis represents the execution time within one period of the control system 300 integrated by the execution time tuning information 51. A threshold value 72 indicates a period that is a requirement for real-time control of the control system 300, and indicates that real-time property is not guaranteed when the execution time in the period exceeds the threshold value 72.

In a timing chart 811 of FIG. 13, the horizontal axis represents the number of times of periods, and the vertical axis represents an alert output 73 (here, 1 bit).

In a timing chart 812 of FIG. 13, the horizontal axis represents the number of times of periods, and the vertical axis represents the execution time within one period of the control system 300.

The numbers of times of periods on the horizontal axis of the timing charts 810, 811, and 812 are common.

The operation of the control system 300 in the first to ninth of the number of times of periods is similar to the operation of the control system 100 illustrated in the timing chart (FIG. 5) of the first embodiment.

Here, in the tenth of the number of times of periods of the timing chart 810, the execution time within one period exceeds the threshold value 72 due to the addition of new real-time software.

The timing chart 811 indicates that 1 is output as the alert output 73 because the execution time within one period exceeds the threshold value 72 at the tenth and subsequent number of times of periods.

The timing chart 812 indicates that the non-real-time software is not executed in the control system 300 in response to the alert output 73 of the tenth and subsequent number of times of periods being 1, and the absolute value of the total of the execution time within the period hardly changes even at the tenth and subsequent number of times of periods.

The bit stream data 6 is generated by the analysis by the execution time analysis unit 57 of the control system 300, as well as the real-time interface generation unit 53. As a result, 0 is output to the alert output 73 when it is found at the fifteenth of the number of times of periods that the execution time within one period does not exceed the threshold value 72 by executing, in the FPGA 7, the real-time software to be added. As a result, the total of the execution time within the period of the control system 300 in the timing chart 812 matches the execution time within one period of the control system 300 integrated by the execution time tuning information 51 in the timing chart 810.

According to the present embodiment, in the control system for which real-time property is required, it becomes possible to add processing with high real-time property by the programmable logic while maintaining the real-time property, and it is possible to achieve the control system that achieves both high reliability and versatility.

Fourth Embodiment

Figure 14:
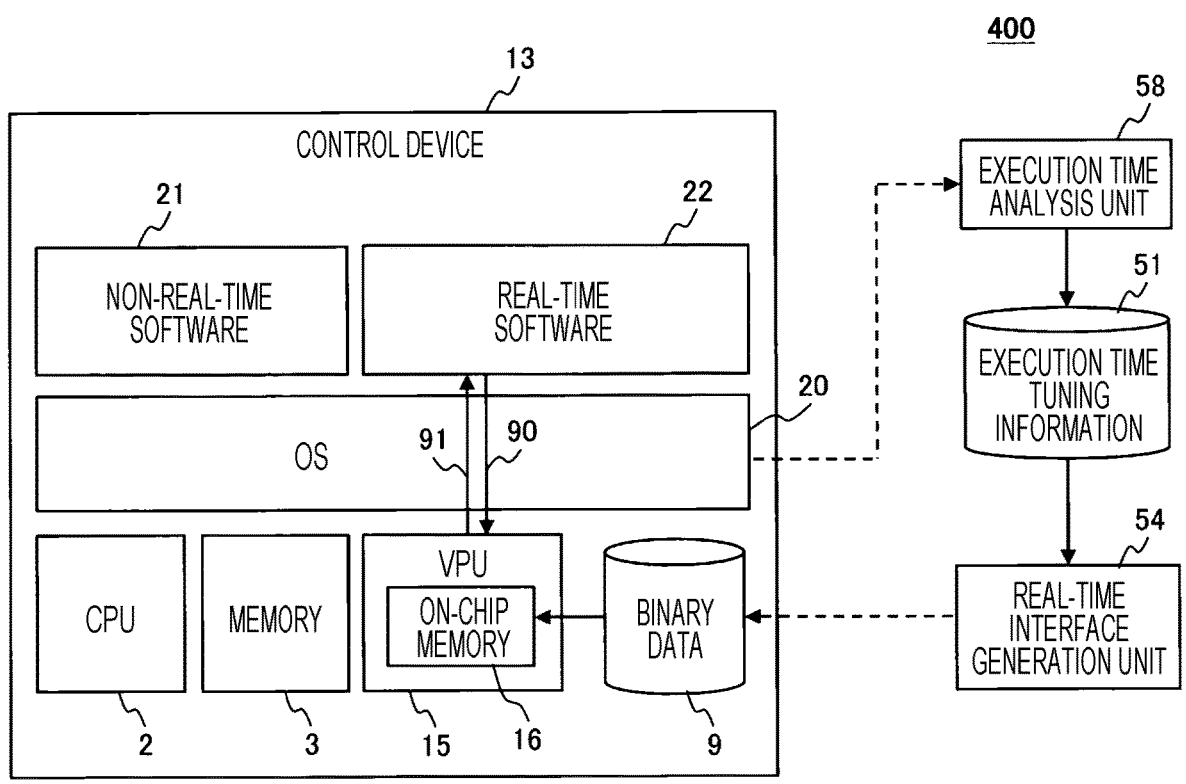
FIG. 14 is a block diagram illustrating an example of a control system according to a fourth embodiment.

Next, a control system 400 according to the fourth embodiment will be described with reference to the drawings. FIG. 14 is a block diagram illustrating the control system 400 according to the fourth embodiment.

The control system 400 described in the present embodiment executes real-time software by a visual processing unit (VPU).

The control system 400 described in the present embodiment is different from the control system 300 described in the third embodiment (FIG. 8) in that a control device 13 includes a VPU 15 incorporating an on-chip memory 16, and the real-time software 22 is executed by the VPU 15.

In the control device 13, the non-real-time software 21 and the real-time software 22 perform processing of the control system 400. Execution time information of each piece of software is input to an execution time analysis unit 58 via the OS 20, and the execution time tuning information 51 is output as a result of analysis by the execution time analysis unit 58. A real-time interface generation unit 54 generates binary data 9 based on the execution time tuning information 51, and the binary data 9 is used by the control device 13 as update information of the control device 13. In the example of FIG. 14, the binary data 9 updates the on-chip memory 16 that determines the processing scheme of the VPU 15.

Note that although FIG. 14 illustrates an example in which there are one type of non-real-time software and one type of real-time software, there may be a plurality of types.

The execution time analysis unit 58 illustrated in FIG. 14 can be similarly operated by replacing the processing in the FPGA by the VPU in the flowchart of the execution time analysis unit 57 described in the third embodiment (FIG. 9). Thus, the execution time analysis unit 58 has a function similar to that of the execution time analysis unit 57 of the third embodiment, and can execute the processing by changing the program. Therefore, similarly to the execution time analysis unit 57, the execution time analysis unit 58 can be achieved by a calculation device that executes processing according to a program.

The real-time interface generation unit 54 illustrated in FIG. 14 can be similarly operated by replacing the processing for the FPGA by the processing for the VPU in the flowchart of the real-time interface generation unit 53 described in the third embodiment (FIG. 10). Here, the real-time interface generation unit 54 has a similar function to that of the real-time interface generation unit 53 of the third embodiment. Therefore, it becomes possible to change the processing by changing the program.

According to the present embodiment, in the control system for which real-time property is required, it becomes possible to add processing with high real-time property by dedicated hardware while maintaining the real-time property, and it is possible to achieve the control system that achieves both high reliability and versatility.

In the present embodiment, the non-real-time software is executed by the CPU, and the real-time software is executed by the VPU. However, the present invention is not limited to this allocation. The allocation may be flexibly changed according to the content of the execution time tuning information, for example, non-real-time software is executed by the VPU and real-time software is executed by the CPU.

Fifth Embodiment

A control system 500 according to the fifth embodiment will be described.

Figure 15:
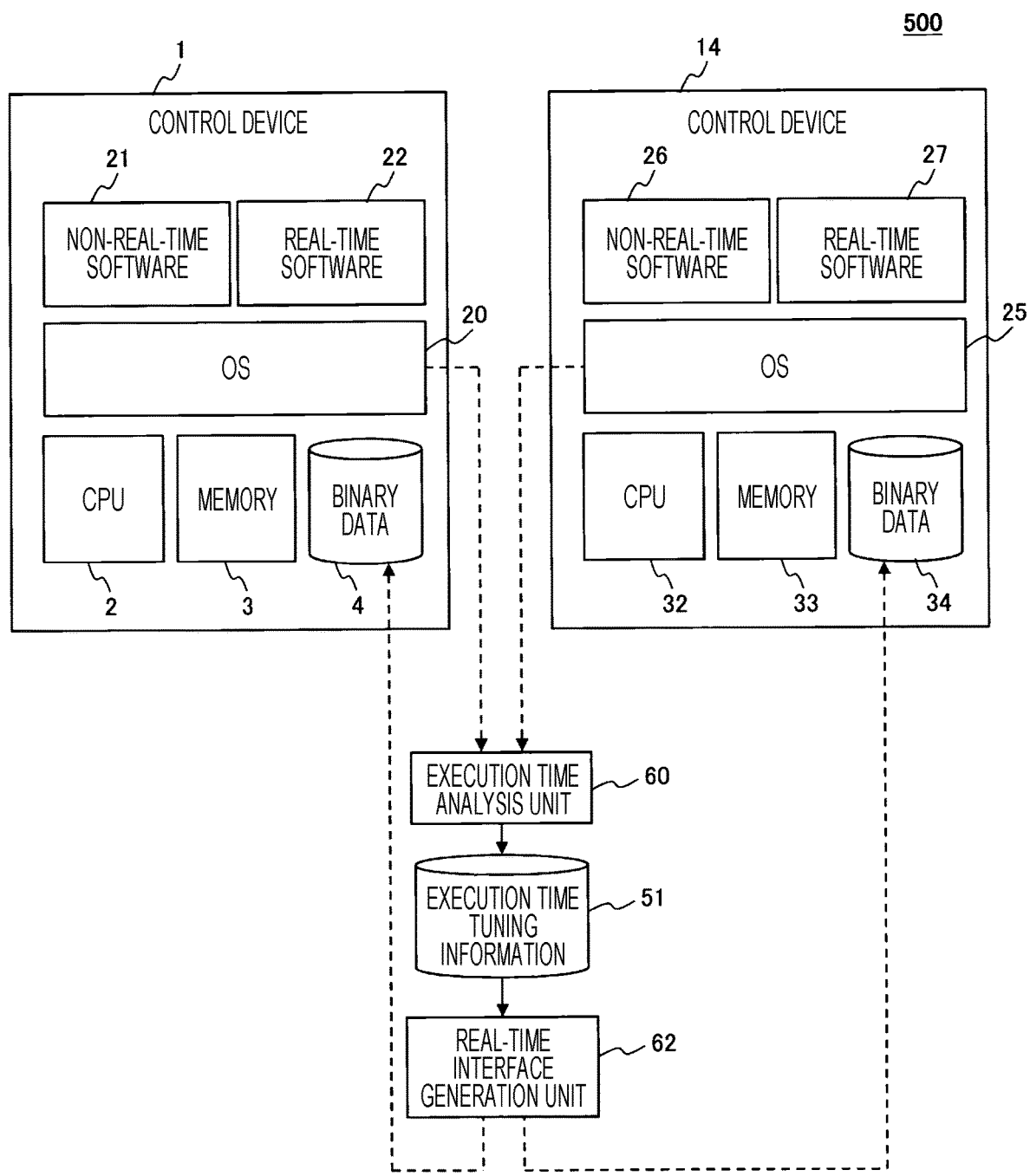
FIG. 15 is a block diagram illustrating an example of a control system according to a fifth embodiment.

FIG. 15 is a block diagram illustrating the control system 500 according to the fifth embodiment.

The control system 500 illustrated in FIG. 15 is different from the control system 100 of the first embodiment (FIG. 1) in that the control system 500 includes a plurality of control devices that are the control device 1 and a control device 14, which is similar to the control device 1. Furthermore, the difference lies in that in the control system 500, execution time information of each piece of software is input from the OS 20 and an OS 25 to an execution time analysis unit 60, and that the binary data 4 and binary data 34 are output from a real-time interface generation unit 62.

Such a configuration of the control system 500 allows a portion where the non-real-time software or the real-time software is executed to be flexibly selected in accordance with the margin of the execution time of the plurality of OSs of the plurality of control devices.

According to the present embodiment, in the control system for which real-time property is required, it becomes possible to add processing with high real-time property on a different OS while maintaining the real-time property, and it is possible to achieve the control system that achieves both high reliability and versatility.

Note that in the present embodiment, the two control devices constitute the control system, but more control devices may constitute the control system. Note that, needless to say, any of the first to third embodiments can be applied to the processing flow of the present embodiment.

Sixth Embodiment

A sixth embodiment in which the control system of the present invention is applied to the plant P1 will be described.

Figure 16:
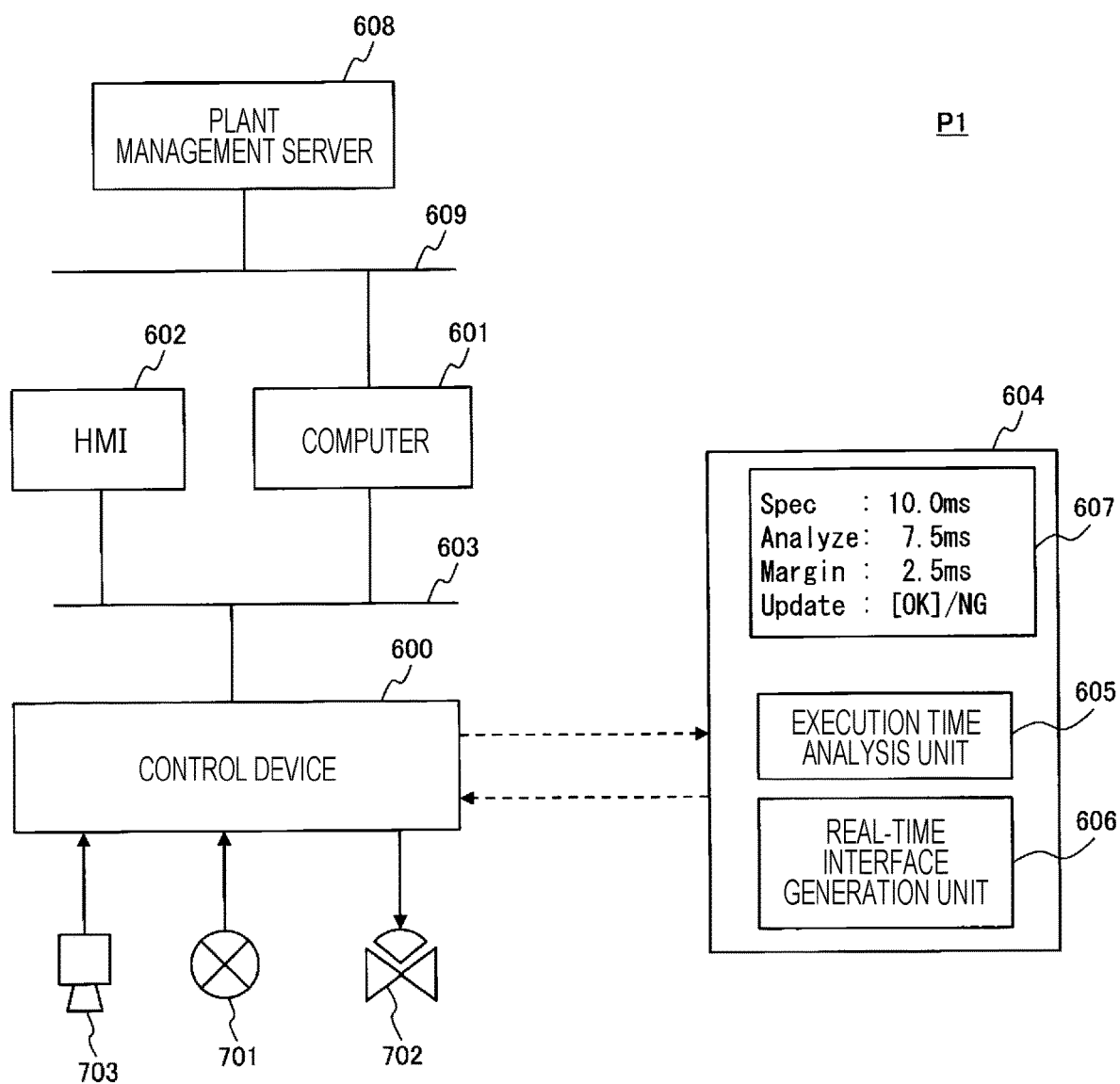
FIG. 16 is an explanatory diagram illustrating an example of a case in which a control system according to each embodiment of the present invention is applied to a plant P1.

FIG. 16 is an explanatory diagram illustrating a case in which the control system of the present invention is applied to the plant P1.

In the plant P1 described in the present embodiment, a control device 600 to which a sensor 701 (an example of a weighing device) and a valve 702 (an example of an operation device) are connected is connected to a human machine interface (HMI) 602 and a computer 601 via a control network 603. The HMI 602 and the computer 601 are connected to a plant management server 608 via an information network 609. Then, the plant management server 608 is configured to monitor the state of the plant P1 and issue a command at the time of abnormality or at the time of emergency.

The control device 600 constituting the control system of the present invention is configured to receive the field data from the sensor 701 and output a control command to the valve 702 within a period time that is a real-time requirement.

In FIG. 16, a camera 703 (an example of an imaging device) is connected to the control device 600 to capture the operating state in the plant P1. The video captured by the camera 703 is input to the control device 600 as moving image data, and non-real-time software that processes the moving image data is added to the control device 600.

An analysis device 604 including an execution time analysis unit 605, a real-time interface generation unit 606, and a display screen 607 is used by being connected to the control device 600.

When non-real-time software that processes moving image data from the camera 703 is newly added to the control device 600 in a state where the plant P1 is not in operation, an analysis result is displayed on the display screen 607 by analysis carried out by the execution time analysis unit 605. In FIG. 16, the real-time processing time is 10 ms, the execution time calculated when the non-real-time software is newly added is 7.5 ms, and thus there is a margin of 2.5 ms with respect to the required time constraint. Therefore, it is determined (OK) that this non-real-time software can be added to the control device 600. Due to this, the real-time interface generation unit 606 updates the binary data of the control device 600.

According to the present embodiment, a system such as a plant including a control device and a computer can perform the following. Even in a situation where it is desired to add versatile processing in a case where high-speed real-time property is required, it is possible to easily determine, while the system is stopping, whether or not required real-time performance is satisfied. Therefore, it is possible to design a system that achieves both real-time property and versatility.

Note that, needless to say, any of the first to third embodiments can be applied and the system configuration of the fifth embodiment can be applied to the processing flow of the present embodiment.

Seventh Embodiment

A seventh embodiment in which the control system of the present invention is applied to the plant P2 will be described.

Figure 17:
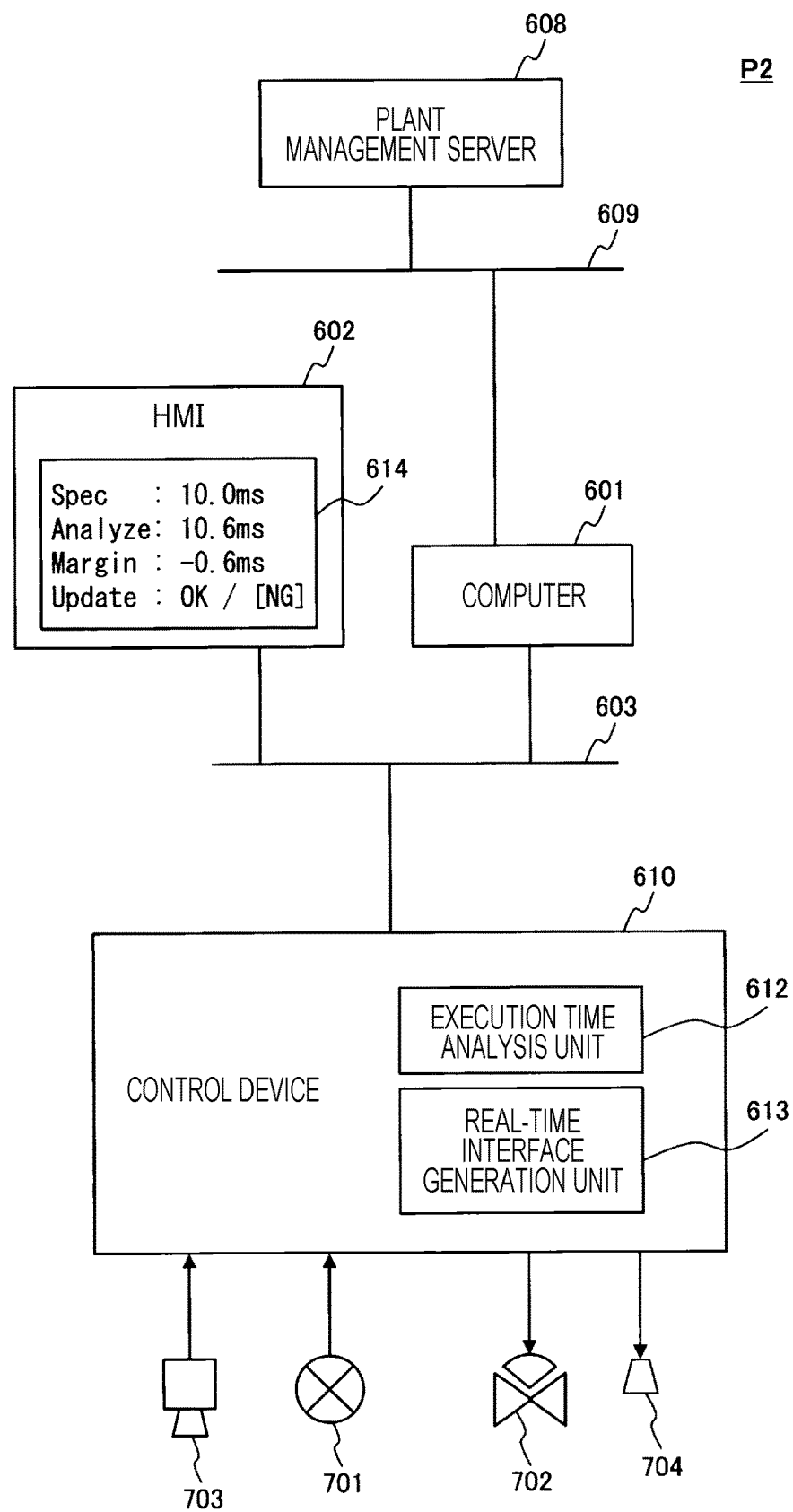
FIG. 17 is an explanatory diagram illustrating an example of a case in which a control system according to each embodiment of the present invention is applied to a plant P2.

FIG. 17 is an explanatory diagram illustrating a case in which the control system of the present invention is applied to the plant P2.

The plant P2 described in the present embodiment is different from the plant P1 of the sixth embodiment (FIG. 16) in that an execution time analysis unit 612 and a real-time interface generation unit 613 are included in a control device 610. Furthermore, the difference lies in that a display screen 614 is included in the HMI 602, and a warning light 704 (an example of a display device) is connected to the control device 610.

In FIG. 17, the camera 703 is connected to the control device 600 to capture the operating state in the plant P1. The video captured by the camera 703 is input to the control device 610 as moving image data, and non-real-time software that processes the moving image data is added to the control device 610.

When non-real-time software that processes moving image data from the camera 703 is newly added to the control device 610 in a state where the plant P2 is in operation, an analysis result is displayed on the display screen 614 by analysis carried out by the execution time analysis unit 612. In FIG. 17, the period time that is a requirement of the real-time processing is 10 ms, the execution time calculated when the non-real-time software is newly added is 10.6 ms, which exceeds the required time constraint by 0.6 ms. Therefore, it is determined (NG) that this non-real-time software cannot be added to the control device 610. Due to this, the real-time interface generation unit 613 does not generate and does not update binary data for update. When the software cannot be added, the warning light 704 is turned on to notify the site of the plant P2 that the non-real-time software cannot be added and the processing cannot be changed.

According to the present embodiment, even in a situation where it is desired to add versatile processing in a case where high-speed real-time property is required, a system such as a plant including a control device and a computer can perform the following. It is possible to easily determine, while the system is in operation, whether or not required real-time performance is satisfied, and it is possible to design a system that achieves both real-time property and versatility.

Note that the control system described in these embodiments can be used for various systems such as elevator control systems, railway control systems, automobile control systems, construction machine control systems, and power generation control systems.

Note that, needless to say, any of the first to third embodiments can be applied and the system configuration of the fifth embodiment can be applied to the processing flow of the present embodiment.

Note that the present invention is not limited to the embodiments described above, and includes various modifications.

For example, the above-described embodiments describe the control system in detail and in a specific manner for an easy-to-understand description of the present invention, and are not necessarily limited to those having all the described configuration elements. Some of the configuration requirements of a certain embodiment can be replaced by some of the configuration elements of another embodiment. A configuration requirement of a certain embodiment can be added to the configuration requirement of another embodiment. Some of the configuration requirements of each embodiment can be added to, deleted from, or replaced by some of the other configuration elements.

REFERENCE SIGNS LIST 1, 10, 11, 12, 13, 14, 600, 610 control device
2, 5, 32 CPU (central processing unit)
3, 33 memory
7 FPGA (field programmable gate array)
8 configuration memory
15 VPU (visual processing unit)
16 on-chip memory
20, 25 OS (operating system)
21, 23, 26 non-real-time software
22, 24, 27 real-time software
50, 56, 57, 58, 60, 605, 612 execution time analysis unit
52, 53, 54, 62, 606, 613 real-time interface generation unit
93 control circuit
94 arithmetic unit
95 storage element
100, 200, 300, 400, 500 control system
601 computer
602 HMI (human-machine interface)
603 control network
604 analysis device
607, 614 display screen
608 plant management server
609 information network
701 sensor
702 valve
703 camera
704 warning light

The invention claimed is:

1. A control system comprising:
a control device including at least one processor that executes:
an operating system, and
non-real-time software executed on the operating system,
the control device further including a field-programmable gate array (FPGA) or a visual processing unit (VPU) configured to execute real-time software for performing real-time control of a control target by the control device, the FPGA or VPU receiving one or more signals from the operating system for executing the real-time software,
an execution time analysis unit that executes on the at least one processor of the control device or on another processor, and that analyzes execution time information of the non-real-time software and execution time information of the real-time software to determine whether processing of the real-time software is performed within a predetermined period specified for real-time control of the control target, and based at least on an analysis result of the execution time analysis unit, a real-time interface generation unit is executed on the at least one processor of the control device or on the other processor to determine an updated configuration of the control device for allocating execution of the real-time software and the non-real time software between the at least one processor and the FPGA or VPU, wherein the real-time interface generation unit determines the updated configuration based on (i) the real-time software and the non-real-time software, (ii) the FPGA or VPU, and (iii) at least one of the operating system or a real-time operating system (RTOS), and wherein the real-time interface generation unit determines to provide the updated configuration by applying an order of priority to the real-time software and the non-real-time software, the FPGA or VPU, and the at least one of the operating system or the RTOS.

2. The control system according to claim 1, wherein the real-time interface generation unit determines whether to generate data for updating the updated configuration having been determined.

3. The control system according to claim 2, wherein the real-time interface generation unit generates binary data or bit stream data as the generated data.

4. A method for controlling processing in a control device that includes at least one processor for executing an operating system and non-real-time software executed on the operating system, and that further includes a field-programmable gate array (FPGA) or a visual processing unit (VPU) configured to execute real-time software for performing real-time control of a control target by the control device, the FPGA or VPU receiving one or more signals from the operating system for executing the real-time software, the method comprising:

analyzing, by the at least one processor of the control device or by another processor, execution time information of the non-real-time software and execution time information of the real-time software to determine whether processing of the real-time software is performed within a predetermined period specified for real-time control of the control target;

based at least on an analysis result of the analyzing the execution time, determining, by the at least one processor of the control device or by the other processor, an updated configuration of the control device for allocating execution of the real-time software and the non-real time software between the at least one processor and the FPGA or VPU; and generating data for updating the updated configuration having been determined for the control devices, wherein determining the updated configuration is based on (i) the real-time software and the non-real-time software, (ii) the FPGA or VPU, and (iii) at least one of the operating system or a real-time operating system (RTOS), and wherein the updated configuration is provided by applying an order of priority to the real-time software and the non-real-time software, the FPGA or VPU, and the at least one of the operating system or the RTOS.

* * * * *